United States Patent Office 2,778,806
Patented Jan. 22, 1957

2,778,806
PRINTING INK

William M. Hutchinson, Bartlesville, Okla., assignor to Phillips Petroleum Company, a corporation of Delaware No Drawing. Application July 25, 1952,
Serial No. 300,967

6 Claims. (Cl. 260—19)

This invention relates to printing inks. In a further aspect, this invention relates to printing inks containing a vehicle comprising unsaturated fatty acid esters of hydroxylated conjugated diene polymers. In a further aspect this invention relates to mixed unsaturated fatty acid-polybasic acid esters of hydroxylated conjugated diene polymers as vehicles for printing inks.

Printing ink is essentially an intimate mixture of pigments, oils, varnishes, driers, and, frequently, waxy or greasy compounds. Dependent upon the use to which the ink is to be put, the physical characteristics such as viscosity, length, flow and tack are varied, since each particular type of printing and printing press requires different characteristics. Furthermore, each kind or grade of paper stock necessitates the use of a printing ink of different characteristics. In general, there are three divisions of printing inks which are typographic, planographic, and intaglio. Typographic inks comprise probably the largest division of inks, these being used to print from raised surfaces such as ordinary type. These inks consist of soft pigments suspended in viscous vehicles and dry mainly by oxidation of this vehicle. The characteristics of such ink include a long nature, that is—inks that can be drawn out to fairly long threads, and also possess considerable tack or stickiness, and pull.

Planographic inks, those used to print from plane surfaces such as the lithographic and offset process, are generally heavier and shorter than typographic inks although they still possess considerable tack. The materials used in these inks must not be affected by water, since the process depends upon the fact that the ink and water are mutually repellent.

Intaglio inks, which are used for printing from engraved or depressed surfaces, are generally thin inks which consist of low gravity pigments suspended in a highly fluid vehicle.

Each of the following objects is attained by at least one of the aspects of this invention.

An object of this invention is to provide new printing inks. A further object of this invention is to provide printing inks which have controllable physical characteristics such as hardness, tack, and length. A further object of this invention is to provide printing inks having a vehicle containing unsaturated fatty acid esters of hydroxylated conjugated diene polymers. A further object of this invention is to provide printing inks having a vehicle comprising mixed unsaturated fatty acid-polybasic acid esters of hydroxylated conjugated diene polymers. A further object of this invention is to provide inks which are quick drying.

Other objects and advantages of this invention will be apparent to one skilled in the art upon reading this specification.

I have found that valuable printing ink compositions can be produced using a vehicle which comprises unsaturated fatty acid esters and mixed unsaturated fatty acid-polybasic acid esters of hydroxylated conjugated diene polymers, such as hydroxylated liquid polybutadiene. In addition to these esters, these inks also include the usual ingredients of commercial printing inks such as drying oils, driers, pigments, etc. The use of these esters in the ink imparts extremely fast drying characteristics to the ink, improves the body, tack, and paper penetration. Furthermore, they are readily adaptable with common ink pigments and possess superior pigment wetting characteristics. These inks possess extremely good adhesion properties and have excellent durability.

In accordance with one embodiment of this invention, esters are produced by the interaction of a hydroxylated conjugated diolefin polymer (homopolymer or copolymer), such as hydroxylated polybutadiene, with an unsaturated fatty acid having from 12 to 24 carbon atoms per molecule, such as a drying oil acid. Linseed acids are frequently preferred. If desired, esterification can be effected in the presence of a drying oil or a relatively high boiling solvent or diluent as the esterification medium, but it is not necessary that such a material be present.

One method for preparing these esterified compositions comprises heating a mixture of the hydroxylated conjugated diolefin polymer and the acid at a temperature generally in the range between 200 and 600° F., preferably in the range between 250 and 450° F. The heating period will usually be in the range from 10 minutes to 24 hours and more frequently from 30 minutes to 3 hours depending upon the materials used and the temperature chosen. When a drying oil is to be employed in the ink composition, it can be added to the mixture prior to esterification or subsequent to esterification. When the drying oil is added after esterification, the mixture is generally again heated to a temperature in the range between 200 and 600° F. for a period in the range from 10 minutes to 24 hours and more frequently from 30 minutes to 3 hours. A preferred method of operation, when a drying oil or solvent is employed, is to add the fatty acid to the drying oil or solvent and warm the mixture if necessary to effect solution. The hydroxylated polymer is then introduced and esterification carried out at the desired temperature. An alternative procedure is to add the hydroxylated polymer to the drying oil and then add the acid. It is desirable to agitate the mixture and to operate in an inert atmosphere such as nitrogen, carbon dioxide, or the like. The acid number (mg. KOH/g. sample) of the esterified mixture is preferably around 15 or less.

It is sometimes desirable to employ an oil-soluble resinous acid, i. e., an acid in the resinous state, along with the unsaturated fatty acid and thereby produce a mixed ester. A mixture of the acids and the hydroxylated polymer can be heated, either in the presence or absence of a drying oil or other suitable esterification medium, or esterification with the unsaturated fatty acid can be effected first and the resinous acid added later. Heating is then continued to effect further esterification.

In accordance with another embodiment of this invention, esterified compositions comprising mixed, unsaturated fatty acid-polybasic acid esters of hydroxylated conjugated diolefin polymers are provided. These mixed ester compositions are produced by the interaction of hydroxylated polymeric material, such as hydroxylated polybutadiene, with an unsaturated fatty acid containing from 12 to 24 carbon atoms per molecule and a polybasic acid, such as a dibasic acid, or the corresponding anhydride, either simultaneously or in two stages. Esterification can be effected either in the presence or absence of an esterification medium as hereinbefore described.

These mixed, unsaturated fatty acid-polybasic acid esters can be prepared by heating a mixture of the acids with the hydroxylated conjugated diolefin polymer, either in the presence or absence of a drying oil or relatively high boiling solvent, at a temperature generally in the range between 200 and 600° F., preferably in the range between 250 and 450° F. The heating period will usually be in the range from 10 minutes to 24 hours and more frequently from 30 minutes to 3 hours depending upon the materials used and the temperature chosen. When the reaction is carried out in two stages, esterification with the unsaturated fatty acid can be effected first and then with the polybasic acid. It is generally preferred that the temperature of the reaction mixture be around 200–300° F. before the polybasic acid is added although this is not mandatory. If the first stage of the esterfication has been carried out at a high temperature, the mixture is usually cooled prior to addition of the polybasic acid. After addition of the polybasic acid, esterification is continued at a temperature in the range between 200 and 600° F., preferably in the range between 250 and 450° F., the time required for reaction being in the range between 10 minutes and 24 hours and more frequently from 30 minutes to 3 hours. The acid number of the esterified mixture is preferably around 15 or less.

As indicated hereinabove, it is sometimes desirable to employ an oil-soluble resinous acid, i. e., an acid in the resinous state, along with the unsaturated fatty acid and polybasic acid. It is frequently preferred to add the resinous acid along with the unsaturated fatty acid in the first stage of the esterification. In some cases esterification with both the unsaturated fatty acid and the polybasic acid, or anhydride, is effected first and the resinous acid is added later. Heating is then continued to effect further esterification.

When preparing the esterified compositions, generally not more than 90 percent of the hydroxy groups present in the hydroxylated polymer are esterified and frequently not more than 75 percent of the hydroxy groups are esterified.

The hydroxylated conjugated diolefin polymers employed in the practice of this invention can be prepared by any suitable method. For example, in accordance with one method, hydroxylated polybutadiene is prepared from polybutadiene by reaction with hydrogen peroxide or a compound capable of yielding hydrogen peroxide, with or without a solvent, in the presence of a catalyst such as formic acid. The polybutadiene employed can be prepared by either mass or emulsion polymerization and can range from a liquid to a rubber-like material. Polymers of other conjugated diolefins as well as copolymers of conjugated diolefins with copolymerizable materials are applicable in the preparation of the compositions of this invention so long as such polymers can be hydroxylated. These polymers include butadiene-styrene copolymers as well as other copolymers. The conjugated diolefins which are applicable are preferably those which contain 4 to 6 carbon atoms per molecule and include 1,3-butadiene, isoprene, piperylene, methylpentadiene, 2,3-dimethyl-1,3-butadiene, etc. The polymers prior to hydroxylation range from liquid materials having a viscosity of 100 Saybolt Furol seconds at 100° F. to rubbery polymers having a Mooney value (ML–4) generally not to exceed 100 and preferably not greater than 50. Hydroxylated polymers which are applicable have an oxygen content in the range between 1 and 20, preferably not more than 15 percent by weight. When esterification of the hydroxylated polymer is effected in the absence of a drying oil, the oxygen content is generally less than 15 percent by weight. The hydroxylation of liquid polybutadiene is more fully described in a copending application of Hillyer and Edmonds, Serial No. 204,062, filed January 2, 1951, now Patent 2,692,892.

Unsaturated fatty acids which are applicable in the practice of this invention are preferably those containing from 12 to 24 carbon atoms per molecule and include drying oil acids such as linseed oil acids, tung oil acids, oiticica oil acids, castor oil acids, cottonseed oil acids, perilla oil acids, and soybean oil acids. Typical unsaturated fatty acids include oleic acid, linoleic acid, linolenic acid, etc. The species frequently preferred is linseed acids. The quantity of acid employed is that chemically equivalent to from about 1 to 100 percent of the number of hydroxy groups in the hydroxylated polymer.

Polybasic acids which are suitable include the various polybasic acyclic and cyclic acids such as polybasic aliphatic acids, polybasic aromatic acids, and polybasic cycloaliphatic acids. Polybasic acids containing 2 to 20 carbon atoms are preferred. Examples of these acids are: phthalic, isophthalic, and terephthalic acids, adipic acid, citric acid, fumaric acid, glutaric acid, maleic acid, malic acid, naphthalic acid, sebacic acid, succinic acid, tartaric acid, etc. Phthalic, maleic, and fumaric acids are generally preferred. Anhydrides of these acids are also applicable. The amount of polybasic acid or anhydride employed is that equivalent to from 1 to 20 percent, preferably 5 to 13 percent, of the hydroxy groups in the hydroxylated polymer. The amount of unsaturated fatty acid used therewith is determined, at least in part, by the amount of polybasic acid or anhydride employed. If it is assumed that the polybasic acid will react with a certain number of hydroxy groups, then the quantity of unsaturated fatty acid employed is that which is equivalent to from 1 to 90 percent of the remaining hydroxy groups in the hydroxylated polymer.

Resinous acids which are applicable are those containing from 16 to 30 carbon atoms per molecule and include rosin acids, such as abietic acid, dehydro-, dihydro-, and tetrahydroabietic acids, disproportionated rosin acids, hydrogenated rosin acids, aromatized rosin acids, and maleic anhydride adducts of rosin acids, d-pimaric acid, levopimaric acid, tall oil (mixture of oleic and rosin acids), tall oil adduct of maleic anhydride, such as with 3 percent by weight of maleic anhydride, and the like. These resinous acids can be employed in amounts equivalent to from 0 to 99 percent of the hydroxy groups in the hydroxylated polymer.

Drying oils, including the so-called semi-drying oils, which are applicable include linseed oil, soybean oil, oiticica oil, castor oil, cottonseed oil, perilla oil, tung oil, and the like. These oils are employed in amounts which range from 0 to 95 percent by weight of the total mixture.

It is to be understood that the compositions herein described can be prepared from single acids or mixtures of various acids and also from a single hydroxylated polymer or a mixture of hydroxylated polymers. Likewise drying oils from a single source or mixtures of drying oils can be employed.

The viscosity of the compositions herein described is generally in the range between Q on the Gardner scale to a point just short of the gel point. The viscosity desired in the esterified compositions is dependent to a large extent upon the other ingredients which make up the total ink formulation and the uses of the resulting ink products.

It is frequently desirable to incorporate phenolic resins into the esterified compositions to give increased durability or hardness. Materials designated as 100 percent phenolic resins, i. e., a simple condensate of a phenol with an aldehyde, such as p-phenylphenol with formaldehyde, are generally preferred although modified phenolic resins, i. e., phenolic resins modified with rosin acids, are also applicable. When these resins are employed, they are usually added after esterification of the hydroxylated polymers.

General practice with inks which are to be used on high speed presses is to add driers unless the inks are to dry entirely by absorption or by penetration into the material on which they are used. What is generally referred to as drying of the ink is actually an oxidation process of the drying oils contained therein and, in order to have a quick drying ink, substances which catalyze this drying are included. These properties are found in compounds of lead, cobalt and manganese, usually linoleates and naphthenates. Other commercial driers are lead borate and manganese borate.

The compositions prepared according to this invention generally comprise 5 to 95% by weight drying oil, preferably in the range 25 to 75% by weight, and 5 to 95% by weight hydroxylated conjugated diene polymer ester, preferably in the range 25 to 75% by weight. It is also preferred that the hydroxylated conjugated diene polymer-organic polybasic acid ester content of the composition does not comprise more than 15% by weight. These percents by weight are based upon the normally nonvolatile constituents of these compositions, excluding added driers and pigments since these materials are added in varying amounts depending upon the particular pigment or drier used. Driers are sometimes used in percentages as high as 15% by weight but usually much smaller amounts are sufficient. Such amounts depend, of course, upon the particular application. The amount of pigment used depends upon the particular application and more particularly upon the type of pigment which is present. In the field of white pigments, for example, titanium dioxide has a relatively high tinting strength, approximately seven times that of zinc oxide which is also used as a white pigment.

The amount of solvent or thinner used is also capable of wide variation and can range to a figure as high as that of the balance of the material in the ink. At the other extreme, as shown in the examples below, inks can be made according to this invention to which no additional solvent or thinner is added.

If resins, such as the phenolic and modified phenolic resins are added to the inks of this invention they are usually added in an amount in the range of 5 to 50% by weight, preferably in the range of 15 to 35% by weight of the amount of ester and drying oil present.

In general, the solvent or thinner used in the practice of this invention can comprise any of the usual organic materials which are compatible with the other components present. As representative examples there may be mentioned hydrocarbon solvents such as the normally liquid aliphatic and liquid aromatic hydrocarbons, for example, hexane, benzene and toluene. Other specific solvents which can be used are acetone, ethyl acetate, methylethylketone and the commercial solvents such as "cellosolve."

In order to present my invention in greater detail the following examples are set out below, although it is intended that the subject matter of the said examples shall be illustrative and not limitative of the present invention.

*Example I*

Liquid polybutadiene prepared by sodium catalyzed polymerization, having a viscosity of 488 Saybolt Furol seconds at 100° F. and a Gardner color of 10, was hydroxylated in chloroform with 20 percent aqueous hydrogen peroxide in the presence of formic acid. The ratio of these reactants was three $C_4$ equivalents of the liquid polybutadiene per mol of anhydrous hydrogen peroxide per mol of formic acid. The product had an oxygen content of 12.8 percent by weight.

Thirty-four grams (43.6 wt. percent) of the hydroxylated liquid polybutadiene, 40 grams (51.3 wt. percent) linseed acids, and 4 grams (5.1 wt. percent) phthalic anhydride were charged to a reactor which had previously been flushed with carbon dioxide. The mixture was stirred and heated to 300° F. in a carbon dioxide atmosphere and then maintained at that temperature for two hours.

Linseed oil (172 grams) was added to the reaction product of hydroxylated liquid polybutadiene, linseed acids, and phthalic anhydride and the mixture heated, in an atmosphere of carbon dioxide, to 550° F. and then maintained at that temperature for two hours. The reactants were stirred during the heating period. Approximately 2.5 grams of unreacted phthalic anhydride was recovered at the conclusion of the reaction. The product had a Gardner viscosity of T, a Hellige color of 11, and an acid number of 13. This product is hereinafter designated as No. 1.

The esterified hydroxylated polybutadiene-linseed oil composition, designated as No. 1, was employed for the preparation of ink by mixing 16.5 grams of No. 1, 0.275 gram of a mixed lead-cobalt drier, and 1.0 gram of lampblack. The drier was prepared from lead and cobalt naphthenates mixed in a weight proportion of lead to cobalt of 4:1. The lead drier contained 24 per cent lead and the cobalt drier contained 6 percent cobalt. A printing test was made on white paper using rubber type to which the ink had been applied. The ink was dry to touch in less than 30 seconds. This ink product is designated as Ink A.

*Example II*

A second ink preparation, designated as Ink B, was prepared by mixing Ink A with one gram of lampblack in addition to that already employed. The ink was tested as before and was dry to touch in less than 60 seconds.

*Example III*

A third ink preparation, designated as Ink C, was prepared by mixing a portion of Ink B with n-hexane in a weight ratio of 71 percent of the ink to 29 percent of the thinner. This ink was tested as before and was dry when rubbed in less than 30 seconds.

*Example IV*

A fourth ink preparation, designated as Ink D, was prepared by mixing a portion of Ink B with n-hexane in a weight ratio of 40 percent of the ink sample to 60 percent of the thinner. The ink was tested as before and a rub dry test showed that it was dry in less than 30 seconds.

*Example V*

A portion of the product designated as No. 1 in Example I was heated to 580° F. over a 30-minute period and maintained at that temperature for 10 minutes. The resulting material had a Gardner viscosity of Z–6, a Hellige color of 13–14, and an acid number of 6.8. This product is designated as No. 2.

The product designated as No. 2 was employed for the preparation of ink by mixing 13.8 grams of this material with 0.23 gram of a mixed lead-cobalt drier (see Example I), and 0.84 gram of lampblack. A printing test was made on white paper using rubber type to which the ink had been applied. The ink was dry to the touch in less than 60 seconds. This ink product is designated as Ink E.

*Example VI*

An additional 0.84 gram of lampblack was mixed with Ink E. A printing test was made as before. The rub dry time was less than 15 seconds. This product is designated as Ink F.

*Example VII*

To 4 grams of Ink F, 2 grams of n-hexane was added. The resulting ink, when a printing test was made as previously described, gave a rub dry time of less than 15 seconds. This product is designated as Ink G.

As many possible embodiments may be made of this invention without departing from the scope thereof, it is to be understood that all matter herein set forth is to be interpreted as illustrative and not in a limiting sense.

I claim:

1. A printing ink composition comprising coloring matter and driers dispersed in a viscous vehicle comprising a mixed ester of hydroxylated polybutadiene, which has been hydroxylated after polymerization of the butadiene, said ester being the reaction product of an acid selected from the group consisting of polycarboxylic acids containing 2 to 20 carbon atoms per molecule and resinous acids containing 16 to 30 carbon atoms per molecule, said polycarboxylic acid being used in an amount equivalent to 1 to 20% of the hydroxy groups in said polymer and said resinous acid being used in an amount of from 1 to 99% of the hydroxy groups in said polymer; and an unsaturated fatty acid containing 12 to 24 carbon atoms per molecule, said unsaturated fatty acid being used in an amount from 1 to 90% of the hydroxy groups in said polymer after esterification with said acid selected from the group consisting of said polybasic acids and resinous acids; and a vegetable drying oil, said drying oil comprising up to 95% of the total vehicle.

2. A printing ink comprising coloring matter dispersed in a viscous vehicle comprising an ester of a hydroxylated homopolymer of butadiene containing 1 to 15 percent oxygen by weight, said homopolymer having been hydroxylated after polymerization of the butadiene, at least one acid selected from the group consisting of polycarboxylic acids containing 2 to 20 carbon atoms per molecule and resinous acids containing 16 to 30 carbon atoms per molecule, and at least one unsaturated fatty acid containing 12 to 24 carbon atoms per molecule, from 1 to 90 percent of the hydroxy groups in said polymer being esterified, and vegetable oil selected from the group consisting of drying and semi-drying oils, the proportion of said oil being sufficient to render said inks workable on a press.

3. A printing ink comprising coloring matter dispersed in a viscous vehicle comprising an ester of a hydroxylated homopolymer of butadiene, containing 1 to 15 percent oxygen by weight, said homopolymer having been hydroxylated after polymerization of the butadiene, and at least one unsaturated fatty acid containing 12 to 24 carbon atoms per molecule, and at least one acid selected from the group consisting of polycarboxylic acids containing 2 to 20 carbon atoms per molecule and resinous acids containing 16 to 30 carbon atoms per molecule and vegetable oil selected from the group consisting of drying and semi-drying oils, the proportion of said oil being sufficient to render said ink workable on a press.

4. The ink of claim 3 containing, as an additive, a resin selected from the group consisting of phenol-aldehyde resins and rosin-modified phenol-aldehyde resins, said resin being present in an amount of 5 to 50 percent by weight of the total ink.

5. A printing ink comprising coloring matter and driers dispersed in a vehicle comprising an ester of a hydroxylated homopolymer of butadiene, containing 1 to 15 percent oxygen by weight, said homopolymer having been hydroxylated after polymerization of the butadiene, linseed acids, phthalic anhydride, and a vegetable drying oil, said drying oil comprising up to 95 percent by weight of said ink.

6. The ink of claim 5 in which said ester is a mixed ester of said linseed acids and a polycarboxylic acid containing 2 to 20 carbon atoms per molecule.

References Cited in the file of this patent
UNITED STATES PATENTS

| | | |
|---|---|---|
| 2,226,848 | Cornwell | Dec. 31, 1940 |
| 2,609,358 | Pfann et al. | Sept. 2, 1952 |
| 2,634,256 | Sparks et al. | Apr. 7, 1953 |
| 2,645,649 | Hoffman | July 14, 1953 |